(12) United States Patent
Lee et al.

(10) Patent No.: US 7,596,545 B1
(45) Date of Patent: Sep. 29, 2009

(54) AUTOMATED DATA ENTRY SYSTEM

(75) Inventors: Danico Lee, Overland Park, KS (US); Constantinos Tsatsoulis, Lawrence, KS (US); Steven M. Perry, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 380 days.

(21) Appl. No.: 11/214,212

(22) Filed: Aug. 29, 2005

Related U.S. Application Data

(60) Provisional application No. 60/606,613, filed on Sep. 2, 2004, provisional application No. 60/604,964, filed on Aug. 27, 2004.

(51) Int. Cl.
*G06F 7/00* (2006.01)
*G06F 17/30* (2006.01)

(52) U.S. Cl. .................................. 707/2; 707/7; 707/10

(58) Field of Classification Search ............... 707/1–10, 707/100–104.1, 200–206; 715/221–226
See application file for complete search history.

(56) References Cited

U.S. PATENT DOCUMENTS

| | | | |
|---|---|---|---|
| 6,192,380 B1 | 2/2001 | Light et al. ................. 707/505 |
| 6,199,079 B1 * | 3/2001 | Gupta et al. ................ 715/507 |
| 6,449,042 B1 | 9/2002 | Hamann ..................... 356/339 |
| 6,539,351 B1 * | 3/2003 | Chen et al. .................. 704/236 |
| 6,589,290 B1 | 7/2003 | Maxwell et al. ............. 715/507 |
| 6,757,668 B1 * | 6/2004 | Goebel et al. ................ 706/59 |
| 6,910,179 B1 | 6/2005 | Pennell et al. .............. 715/507 |
| 2002/0042265 A1 * | 4/2002 | Kumaran et al. ............ 455/414 |
| 2003/0036890 A1 * | 2/2003 | Billet et al. ..................... 703/2 |
| 2003/0130991 A1 * | 7/2003 | Reijerse et al. ................ 707/3 |
| 2003/0212851 A1 * | 11/2003 | Drescher et al. ............ 711/100 |

OTHER PUBLICATIONS

Microsoft Computer Dictionary, 2002, Microsoft Press, 5th edition, 578.*
Song et al., A semantic similarity approach to electronic document modeling and integration, Jun. 19-21, 2000, IEEE, vol. 1, 116-124 vol. 1.*
Chul-Ki Nam et al., An XML-based active document for intelligent web applications, Mar. 26, 2003, Goolge Scholar, 165-176.*

(Continued)

*Primary Examiner*—Jean B Fleurantin
(74) *Attorney, Agent, or Firm*—Suiter Swantz pc llo

(57) ABSTRACT

The present invention is a novel system and method for providing automated data entry of information. The system may include a processing subsystem capable of processing extensible markup language documents, a predicting subsystem capable of reviewing entered data of an input document and providing a suggestion to the input document, and a database for storing parsed extensible markup language documents. Database may maintain a plurality of relationships among received data of previous documents, and predictor may analyze a plurality of relationships for suggestions. The method for providing automated data entry of information may monitor received data, analyze relationships among received data, and predict a data entry field. A data entry field may be based on received data and relationships among received data. Predicting of data entry fields may incorporate a plurality of predictors whereby one or more values from values provided by each of the plurality of predictors is provided to a user.

19 Claims, 9 Drawing Sheets

OTHER PUBLICATIONS

Quinlan, J.R.; Induction of decision trees; *Machine Learning*, 1, 81-106; 1986.

"BioMed Center—The Open Source Publisher"; URL ,http://www.biomedcentral.com/home/>; Sept. 24, 2003, All Pages.

"APAIS Thesaurus"; URL <http://www.nla.gov.au/apais/thesaurus/about.html>; Oct. 1, 2003, All Pages.

Kristjansson, T., Culotta, A., Viola, P. and McCallum, A.; "Interactive Information Extraction with Constrained Conditional Random Fields"; *Sixteenth Innovative Applications of AI Conference*; AAAI 2004; pp. 412-418.

"PIR Information Resource"; URL <http://pir.georgetown.edu/pirwww>; Jun. 15, 2004, All Pages.

"University of Washington XML Repository"; URL, Aug. 27, 2004, All Pages. <http://www.cs.washington.edu/research/xmldatasets/www/repository.html>; Jun. 15, 2004, All Pages.

"iProClass—An Integrated Protein Classification Database"; URL <http://pir.georgetown.edu/iproclass>; Jun. 18, 2004, All Pages.

"European Bioinformatics Institute"; URL <http://www.ebi.ac.uk/trembl/index.html>; Jun. 22, 2004, All Pages.

"Gator eWallet"; URL <http://www.gator.com/>; Sep. 8, 2004, All Pages.

"Google Toolbar"; URL <http://toolbar.google.com/>; Sep. 8, 2004, All Pages.

"RoboForm: Free Password Manager, Form Filler, Password Generator: Fill Forms, Save Passwords, AutoFill, AutoLogin, AutoSave"; URL <http://www.roboform.com/>; Sep. 8, 2004, All Pages.

"Verity, Inc.: Intellectual Capital Management—Enterprise Search and Business Process Management"; URL <http://www.verity.com/>; Oct. 5, 2004, All Pages.

Lee, D. and Tsatsoulis, C., "Intelligent Data Entry Assistant for XML Using Ensemble Learning"; *International Conferences on Intelligent User Interfaces 2005*; ACM Press; pp. 83-89, All Pages.

"UCI Machine Learning Repository"; URL <http://www.ics.edu/-mleanr/MLRepository.html>; Apr. 15, 2005, All Pages.

Maret, P., Beney, J. and Rubel, P.; "Multimedia Information Interchange: Web Forms Meet Data Servers"; *IEEE International Conference on Multimedia Computing and Systems*; vol. 2, pp. 499-505, Aug. 27, 2004.

Russell, S. and Norvig, P.; *Artificial Intelligence A Modern Approach*, Second Edition; Prentice Hall; pp. 663-668, Aug. 27, 2004.

\* cited by examiner

AUTOMATED DATA ENTRY SYSTEM

CROSS-REFERENCE TO RELATED APPLICATIONS

The present application claims the benefit under 35 U.S.C. § 119 of U.S. Provisional Application No. 60/604,964, filed on Aug. 27, 2004 and U.S. Provisional Application No. 60/606,613, filed on Sep. 2, 2004. Said U.S. Provisional Patent Application 60/604,964 and U.S. Provisional Patent Application 60/606,613 are herein incorporated by reference in their entirety.

FIELD OF THE INVENTION

The present invention relates generally to the field of data entry processing and more particularly to a system and method for providing automated data entry of information.

BACKGROUND OF THE INVENTION

Data entry processing is widely known method for collecting and storing information. Manual data entry is utilized extensively in numerous industries to gather data and maintain databases. However, manual data entry is often a tedious, time consuming and labor intensive task. Additionally data entry processing may be quite costly, often requiring companies to hire additional employees to accomplish data entry tasks, or outsource data entry tasks to data entry specialists. Further, because data entry is typically performed manually, the process is highly error-prone.

With the advent of e-commerce, consumers and businesses alike are often required to provide information to other parties via the Internet, usually by completing a web-based form or set of forms. Software tools have been developed to reduce data entry workload by automatically filling in empty data fields for certain types of forms. Such software programs have the ability to assist data entry by accessing predefined user information and filling in blank forms with the appropriate stored data. However, these programs are generally utilized by Hyper Text Markup Language (HTML) generated web-based forms, such as those for consumers making purchases or otherwise providing information on a data entry form via an Internet web page, and have limited usefulness beyond such applications.

Conventional data field population methods are unsuitable for datasets that embody extensible markup language (XML) grammars. XML is a standard data exchange format that allows different communities to define their own tags and attribute names. Current field population systems may not be utilized with sophisticated XML grammars, which contain nested composition and complex tree-like structures. These programs generally only support data that is relatively unsophisticated and linearly structured, and often require a perfect match between an incomplete document and the values and documents already stored to complete the incomplete document. As a result, current programs are not able to predict values for data fields unless there is constant repetition, no variability and a pre-stored perfect match. In contrast, XML data may be highly variable and may not be pre-stored. As a result XML documents require a high volume of manual data entry, which can be very labor intensive, time consuming and error-prone.

Consequently, it would be advantageous if a system and method existed to provide automated data entry of information supported by complex data structures.

SUMMARY OF THE INVENTION

Accordingly, the present invention is directed to a novel system and method for providing automated data entry of information. In a first aspect of the present invention, the system may include a processing subsystem capable of processing extensible markup language documents, a predicting subsystem capable of reviewing entered data of an input document and providing a suggestion to the input document, and a database for storing parsed extensible markup language documents. Database may maintain a plurality of relationships among received data of previous input information, and predicting subsystem may analyze a plurality of relationships to provide one or more suggestions.

In accordance with an additional aspect of the present invention, a method for automating data entry of information is provided. In an embodiment of the invention, the method may monitor received data, analyze relationships among received data, and predict a data entry field. Data entry field may be based on received data and relationships among received data. Predicting of data entry fields may incorporate a plurality of predictors whereby one or more values is provided by each of the plurality of predictors.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
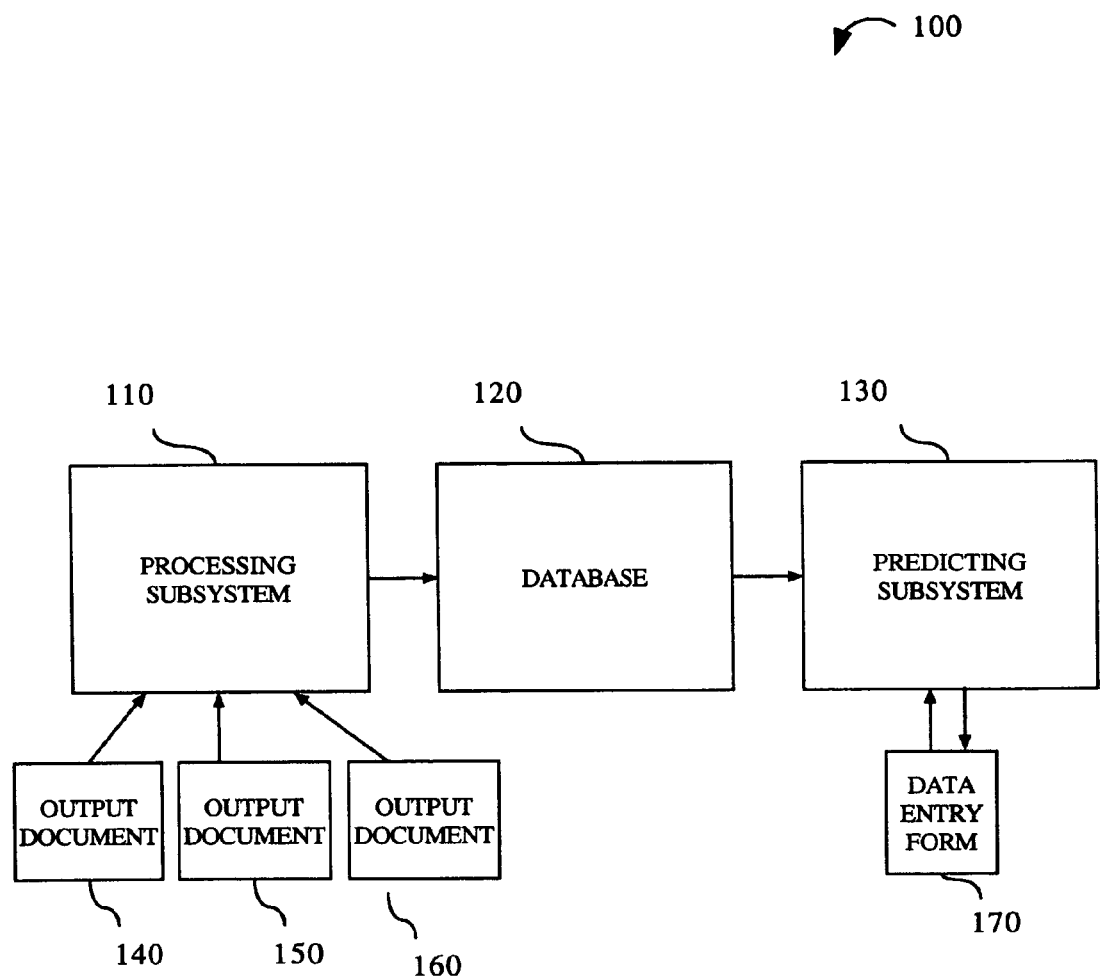
FIG. 1 depicts a data entry system in accordance with an embodiment of the present invention.

Referring to FIG. 1, a system 100 for automating data entry of information in accordance with an embodiment of the present invention is shown. System 100 may be comprised of a processing subsystem 110, a database 120, and a predicting subsystem 130. In an embodiment of the invention, processing subsystem 110 may be suitable for processing information from received documents 140-160, previously completed and supported by complex data structures, such as extensible markup language (XML) documents. It is contemplated that a system and method in accordance with the present invention may be suitable for other markup languages such as Hypertext Markup Language (HTML), Standard Generalized Markup Language (SGML) and the like. Database 120 may store parsed extensible markup language documents, and may further maintain a plurality of relationships among received data of previously completed documents. Predicting subsystem 130 may review entered data of an input document, such as an input form or a data entry form 170 and provide one or more suggestions for an uncompleted field of the data entry form 170. Predicting subsystem 130 may analyze a plurality of relationships for a provided suggestion. For example, the processing system may provide a completed data entry form 170 for empty data fields. Predicting subsystem 130 may analyze previous user entered data in the data entry form 170 and historical documents in a database 120 to predict one or more values for a data field of a data entry form 170. Processing subsystem 130 may process a collection of documents simultaneously or a single document individually, such as when a document may be completed by a user. System 100 may provide a user with one or more suggestions, and a user may select a suggestion provided by the system, an alternative provided suggestion, or may overwrite the provided suggestions and enter a non-suggested value manually. The suggestion which is used, the first suggestion, an alternative suggestion or a user-entered suggestion may be determined to be the correct suggestion. For example, if a user selects a provided suggestion, suggestion may be stored in database 120, and the value may be analyzed by predicting subsystem 130 for providing future suggestions. Similarly, if a user enters a non-suggested value manually, processing subsystem 110 may process the value for storage in a database 120, and the value may be analyzed by predicting subsystem 130 for providing future suggestions.

Figure 2:
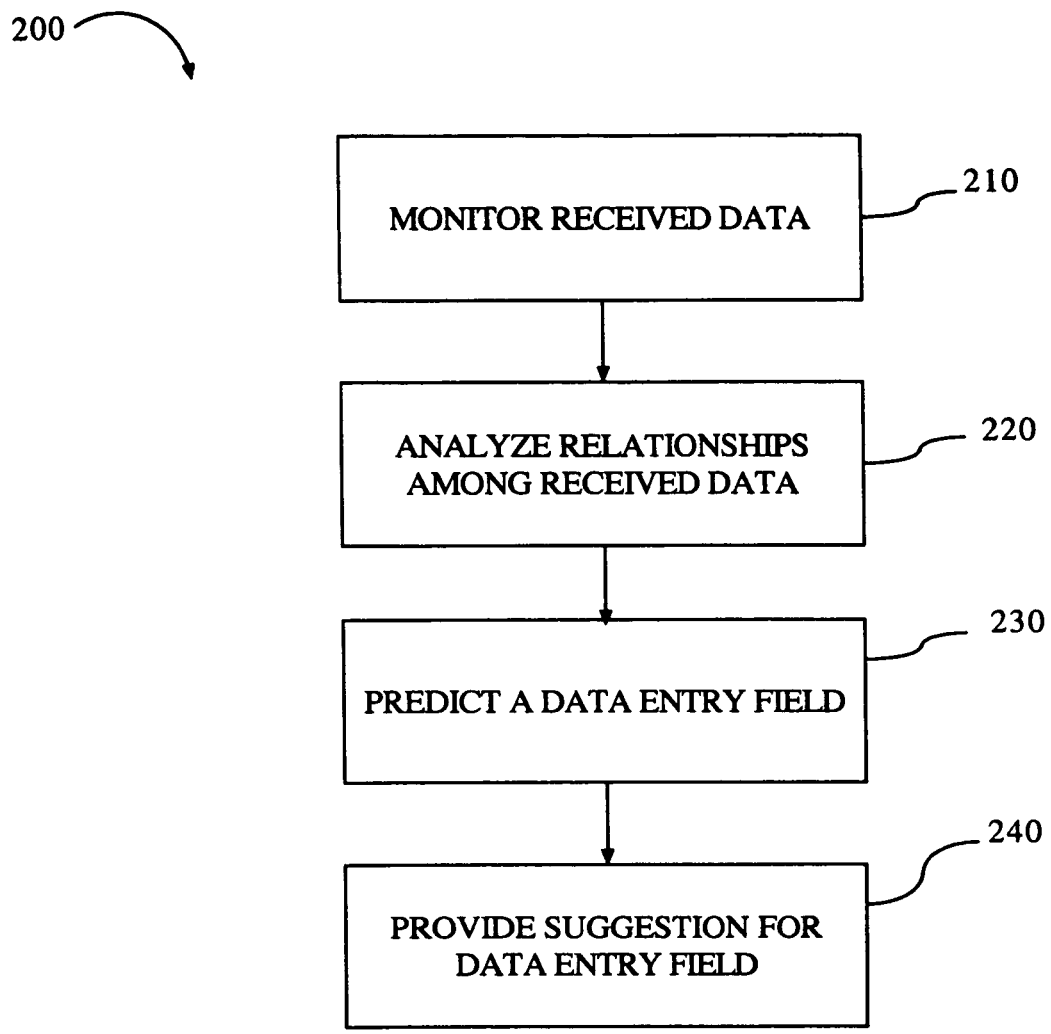
FIG. 2 depicts a flowchart representing a method for automating data entry of information in accordance with an embodiment of the present invention.

Referring to FIG. 2, a flowchart representing a method 200 for automating data entry of information in accordance with an embodiment of the present invention is shown. It is contemplated that system 100 of FIG. 1 may execute method 200 for automating data entry of information. Method 200 may include monitoring received data 210, analyzing relationships among received data 220, and predicting a data entry field 230. Data entry field prediction 230 may be based on received data and relationships among received data, and may include incorporating a plurality of predictors. For example, a prediction may be determined from one or more statistical, inductive, instance-based, neural network, kernel machine, genetic algorithm, reinforcement learning, analytical learning, frequency, or recency predictors, or a combination of one or more types of predictors. It is contemplated that any type of prediction scheme an algorithm may be implemented in accordance with the present invention without departing from the scope and intent of the present invention. Method 200 may further include providing one or more suggestions for a data entry field 240 based on one or more data entry field predictions 230 by employing a voting and weighting scheme in accordance with the present invention as shown in FIGS. 5-8.

Figure 3:
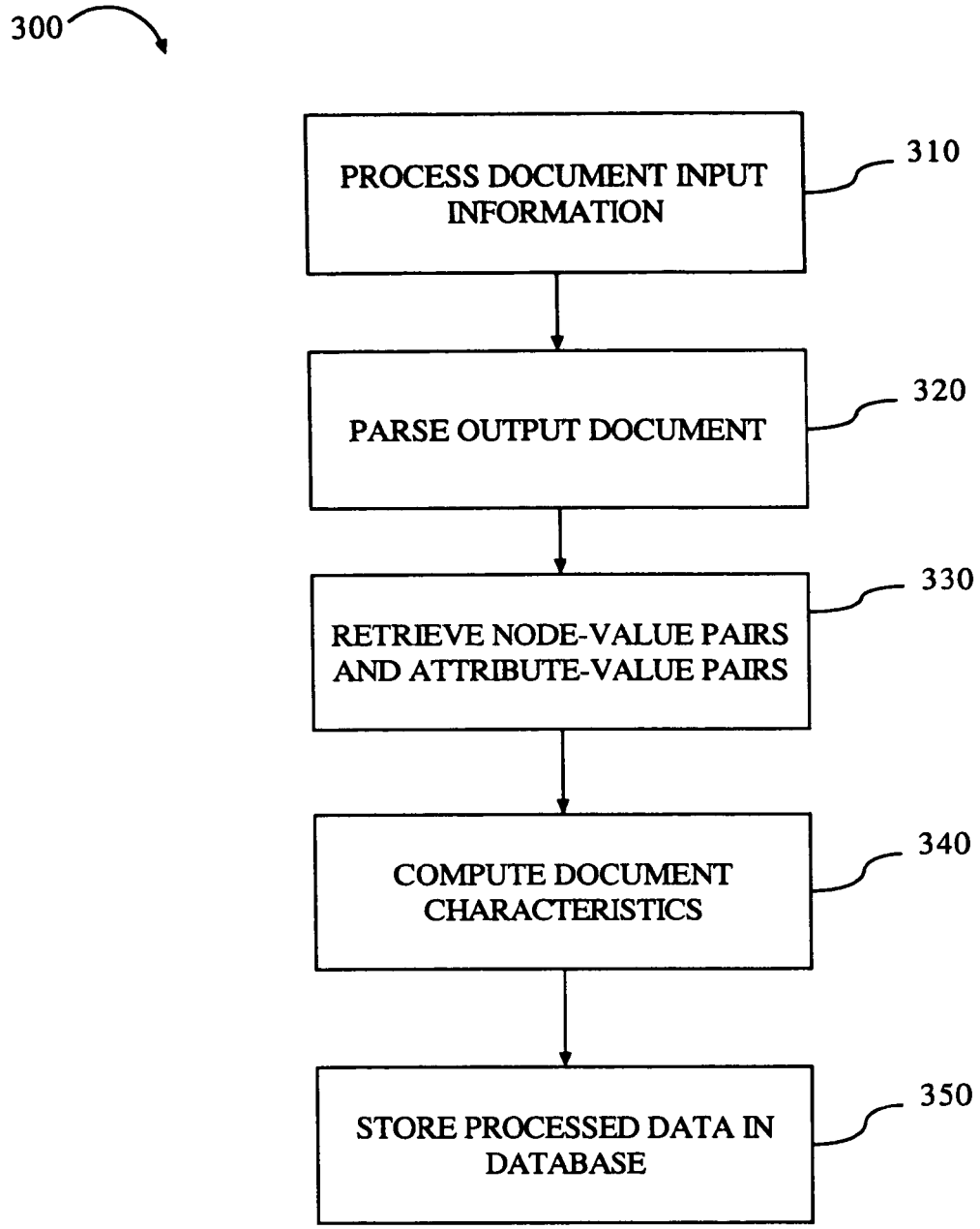
FIG. 3 depicts a flowchart representing a method for processing information in accordance with an embodiment of the present invention.

Referring to FIG. 3, a method 300 for processing information in accordance with an embodiment of the present invention is shown. In an embodiment of the invention, method 300 may be implemented by processing subsystem 110 of FIG. 1. Method 300 may begin by processing of document input information 310. An input document may be parsed 320 by processing subsystem 110, and the completed document may be stored in a document database. Node-value pairs and attribute-value pairs of a document may be retrieved 330. A node-value pair may be defined as the name of a node and a value associated with it. A node may represent a data element of an input document. For example, linearly structured data may contain a set of attributes describing data, events, objects, etc. A node-value pair may describe the name of data, an event or an object, and the values associated with it. An attribute-value pair may be defined as the name of an attribute of a node and the attribute values associated with it. With respect to extensible markup language documents, an attribute is generally an alternate linear method for describing a sub-tree. For example, a value of a node "Address" may be a sub-tree containing nodes such as "Street", "City," "State," etc., each one with its own values. Alternatively, the same tree-like information may be described as a linear attribute: <Address Street="Main" City="NY" State="NY">. Document characteristics may be computed 340 from node-value pairs and attribute-value pairs. Processed data may be stored in an historical collection such as a database 350.

Figure 4:
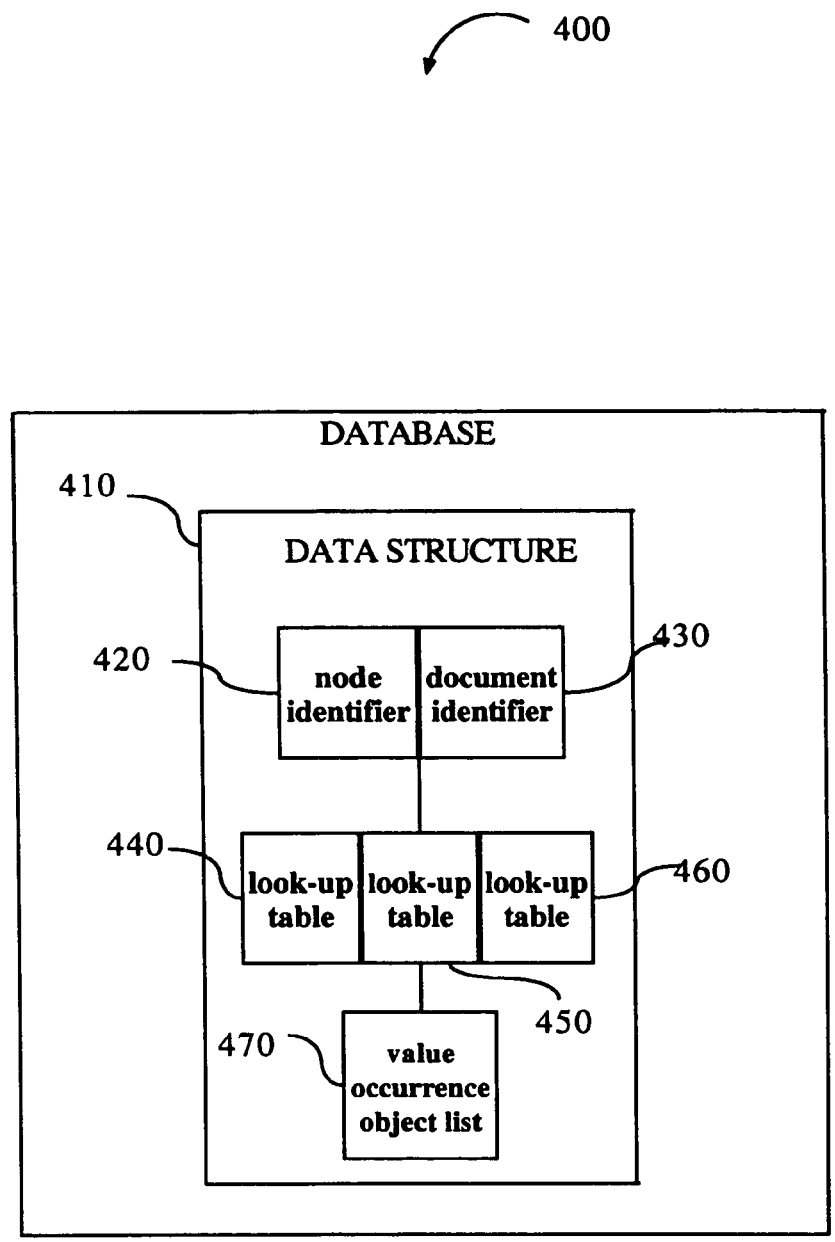
FIG. 4 depicts a database of a data entry system in accordance with an embodiment of the present invention.

Referring to FIG. 4, a block diagram of a database 400 of a data entry system in accordance with an embodiment of the present invention is shown. In a preferred embodiment, database 400 may be a collection of historical documents, and may include a data structure 410 suitable for short or long-term storage of parsed input data, and any relevant information contained therein. Database 400 may collaborate with individual predictors comprising a predicting subsystem 130. Data structure 410 of database 400 may contain an entire document collection in memory, or data structure may be capable of storing a representation of a document collection utilizing memory less than the cumulative size of the documents comprising the collection. Data structure 410 may further allow incremental addition of documents without re-indexing a collection, and may allow fast lookup of node values in a document for which a second node has a given value via fast look-up tables 440-460.

Data structure 410 may be a multidimensional array of value-occurrence objects. Multi-dimensional array may be dimensioned by a plurality of identifiers. In a preferred embodiment, multi-dimensional array may be dimensioned by a first identifier and a second identifier. First identifier may be a node identifier 420, and second identifier may be a document identifier 430. A node may recur in a given document, and a recurring node may assume multiple values. To account for a recurring node in a document, the data structure array may include a value-occurrence object list 470 including an element for a distinct value assumed by a node in a document. A value-occurrence object may consist of a value identifier and an integer count of the recurrence of a value assigned to a node in a document.

Data structure 410 may further include a plurality of lookup tables 440-460. Lookup tables 440-460 may hash strings to integer identifiers and store document names, node names, node values and the like to integer identifiers. Because node names and node values may often be repeated within a document or across multiple documents in a collection, but may only be stored in the database once, memory usage may be reduced. Additionally, each record in a data structure 410 may store an instance of a node in a document with a particular value and a reference to the document in which the node appeared.

Figure 5:
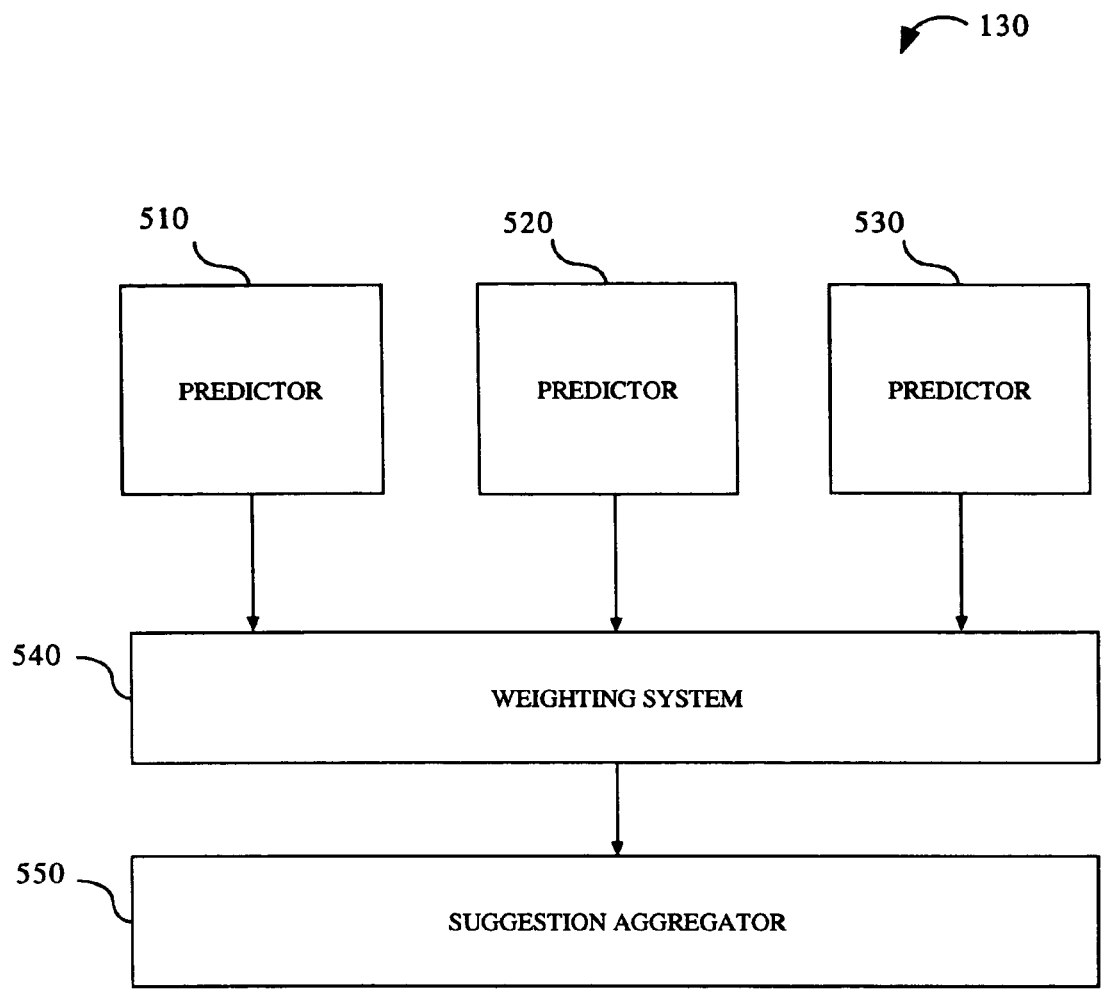
FIG. 5 depicts a predicting subsystem of a data entry system in accordance with an embodiment of the present invention.

Referring to FIG. 5, a block diagram of a predicting subsystem 130 of a data entry system in accordance with an embodiment of the present invention is shown. Predicting subsystem 130 may include a plurality of predictors 510-530, a weighting system 540 and a suggestion aggregator 550. Predicting subsystem 130 may be capable of reviewing the entered data of an input document and providing a suggestion to an uncompleted field of the input document. In a preferred embodiment, predicting subsystem 130 may utilize perfect or approximate equivalency techniques to predict and propose a value for an empty field. Predicting subsystem 130 may further adapt to various domains without customizing algorithms. For example, it is contemplated that an individual predictor may be more suitable for predicting data in a particular domain. A first predictor may more accurately predict data within a domain such as biology, while another may more accurately predict data within a domain such as accounting. Predicting subsystem 130 may determine which of the plurality of predictors provides the most accurate value for a node in a given collection, and one predictor may be preferred over another for future suggestion prediction based on accuracy and success of prediction.

Predicting subsystem 130 may make predictions by determining an exact or approximate equivalent between values in an historical document collection and values in a partially completed new document. Predicting subsystem 130 may employ a plurality of predictive or descriptive algorithms such as machine learning techniques to predict node values. Specifically, predicting subsystem 130 may include a plurality of predictors 510-530 including one or more statistical, inductive, instance-based, neural network, kernel machine, genetic algorithm, reinforcement learning, analytical learning, frequency, recency or like predictors. It is further contemplated that the number and type of predictors included in a predicting subsystem may vary according to system need and may include predictors not specifically enumerated.

Plurality of predictors 510-530 may include one or more statistical predictors. In an embodiment of the invention, statistical predictor may be a method of supervised learning. For example, statistical predictor may be a naïve Bayesian classifier. Statistical predictor may utilize predictive and descriptive techniques to predict node values by analyzing relationships between independent and dependent variables and derive a conditional probability for each relationship. New values may be predicted by combining the effects of independent variables on dependent variables. Statistical predictor may then determine a probability for a node value based on the conditional probabilities of the predicted value given the actual values of previously determined nodes. For example, given values of n fields: $V_1, V_2, \ldots, V_n$, and given a possible A for the value of an empty node, a naïve Bayesian classifier may determine the probability that A is predictably correct by the equation:

$$P(A) = \frac{\prod_{i=1}^{n} P(A \mid V_i)}{\prod_{i=1}^{n} P(A \mid V_i) + \prod_{i=1}^{n} (1 - P(A \mid V_i))}$$

Statistical predictor may be modified to account for causal links between two or more nodes via a rule inductive learning algorithm. Rule inductive learning algorithm may be applied to a document database and may then generate a subset of parameters for database documents. For example, to predict a value for a node, X, inductive learning algorithm may determine that if a value of a node N is $V_n$, then the value of node X is $V_x$, indicating a causal relationship between node N and node X. Statistical predictor may analyze node values determined by inductive learning algorithm to be causally related. Statistical predictor may then provide a suggestion determined from the probability analysis and the learned causal relationship analysis.

Plurality of predictors 510-530 may further include one or more inductive predictors. In a preferred embodiment, inductive predictor may be an inductive machine learning algorithm. For example, inductive predictor may be a C4.5 inductive learning predictor, or a like predictor capable of predicting node values based on other node values. C4.5 inductive learning predictor may utilize one or more decision trees for predicting data. Decision trees may be formed from historical data in a database, which may be translated into if-then rules. A plurality of values may be calculated for a translated rule. For example, a value for rule applicability percentage may be calculated, as well as a value for error. Applicability percentage values may be calculated from a number of applicable instances, such as a quantity of documents to which a rule may apply, and a total number of instances, such as the frequency of node appearance in a document collection. Error values may be calculated from the number of instances for which a rule may be applicable but provides an incorrect value.

C4.5 inductive learning predictor decision trees may be pruned based on a percentage of instances where a rule is determined to be applicable. For example, a decision tree may be pruned based on a determination that there may be 10% of instances where a rule is applicable. A lower threshold of applicability may be established to eliminate rules whose applicability may be less than or equal to the threshold percentage.

Plurality of predictors 510-530 may further include one or more instance-based predictors. In a preferred embodiment, instance-based predictor may be a K-Nearest-Neighbor (KNN) predictor, which identifies the k nearest neighbors of a given object. A KNN predictor in accordance with an aspect of the present invention may include an initial database of documents and a distance metric defining a distance between documents. The KNN algorithm may then locate the k document or documents in a database within the closest proximity to a document to be entered, based on a distance defined by the distance metric. The new document may be predicted to have the same outcome as the predominant outcome in the k closest document or documents in the training data.

A predicting subsystem 130 of a system in accordance with the present invention may further include a weighting system 540 and suggestion aggregator 550. Proposed node values (data entry field suggestions) may be provided by plurality of predictors 510-530. It is contemplated that each predictor of one or more predictors 510-530 may make a plurality of suggestions. For example, predictors 510-530 may provide zero, or one or more node values. If multiple suggestions are provided, individual predictors may determine probable correctness for each suggestion, and rankings may be assigned to suggestions based on the probable correctness determination. Predicting subsystem 130 may determine a single value based upon a voting scheme among the plurality of predictors 510-530. A single selected value may represent the value receiving the largest number of votes among the plurality of predictors. This may be advantageous as the user may only be supplied with a single optimal prediction rather than multiple predictions.

Figure 6:
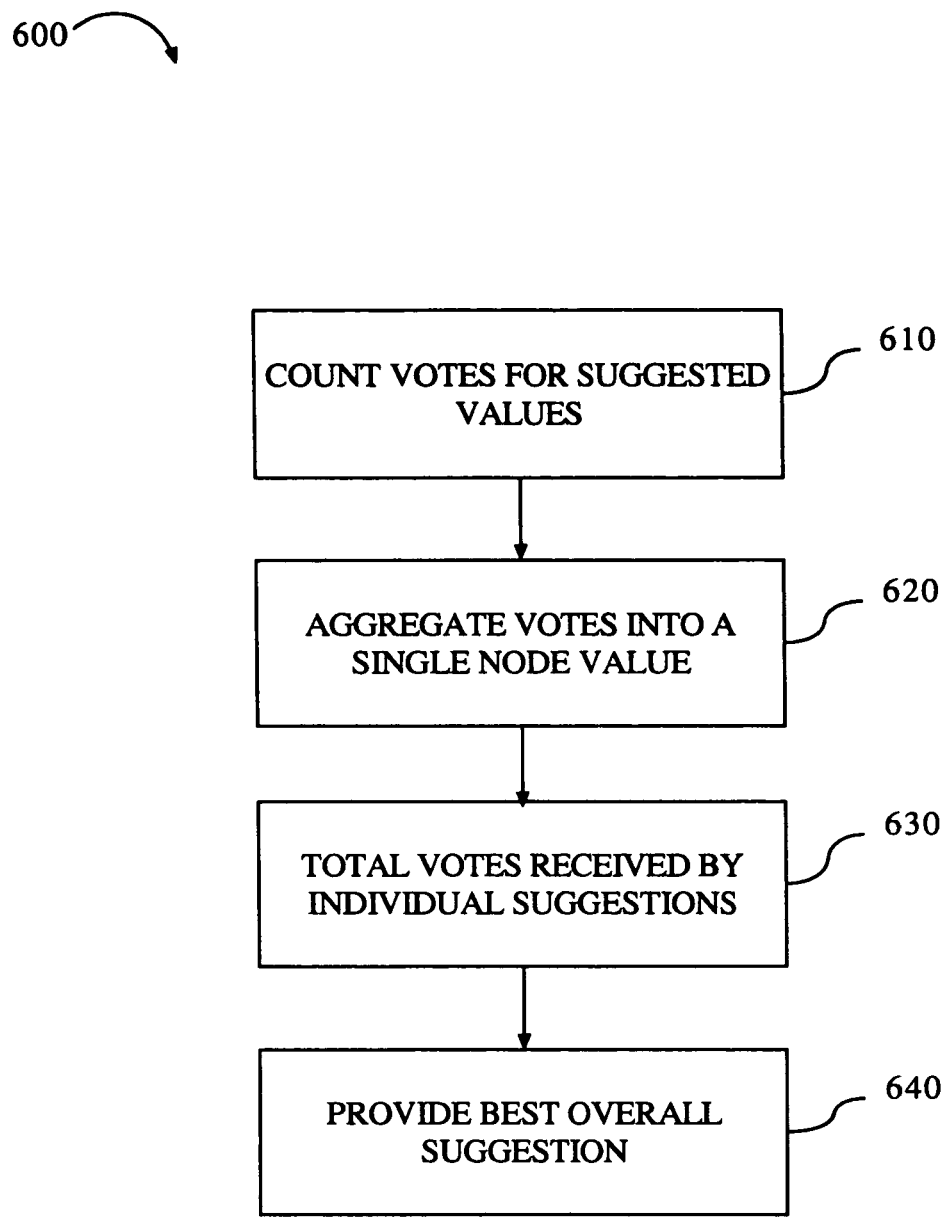
FIG. 6 depicts a flowchart of a method for selecting a single data entry from a plurality of suggestions in accordance with an embodiment of the present invention.

Referring to FIG. 6, a flowchart of a method 600 for selecting a single data entry from a plurality of suggestions in accordance with an embodiment of the present invention is shown. Method 600 may be implemented as a voting scheme executed by suggestion aggregator 550 of FIG. 5. Votes may be counted for a plurality of suggested values 610. Predictor output may be aggregated into a single node value suggestion 620. Aggregating may be accomplished by determining the frequency of occurrence of a distinct suggested value and selecting the value with the maximum occurrence. It is contemplated that one or more predictors may suggest one or more node values from a plurality of possible node values. If a predictor suggests more than one node value, suggestions may be received by an aggregator in a hierarchical order. For example, if a predictor returns N suggestions, a first suggestion may receive a value of N, a second consecutive suggestion may receive the value of N−1, and a third consecutive suggestion may receive a value of N−2. Contributions of ranked suggestions may be accounted for by proportionally distributing votes to suggestions based on a maximum number of suggestions returned by a predictor. In a preferred embodiment, votes may be allocated to a suggestion by subtracting a suggestion's rank from the maximum number of suggestions, and adding an additional vote. Predicting subsystem 130 may then total votes received by individual suggestions 630, and the value with the largest number of votes may be selected as a best overall suggestion. Best overall suggestion, as well as alternative high ranking suggestions, may be provided 640 to a user, who may select one of the provided suggestions, or may overwrite the system and enter a value manually. In an alternative embodiment of the invention, a single suggestion (the best overall suggestion) may be provided. If a user selects a provided suggestion, suggestion may be stored in database 120 and predicting subsystem 130 may include suggestion in a future suggestion prediction. Also, if a user enters a non-suggested value manually, processing subsystem 110 may process the value for storage in a database 120, and the value may be analyzed by predicting subsystem 130 for providing future suggestions.

Figure 7:
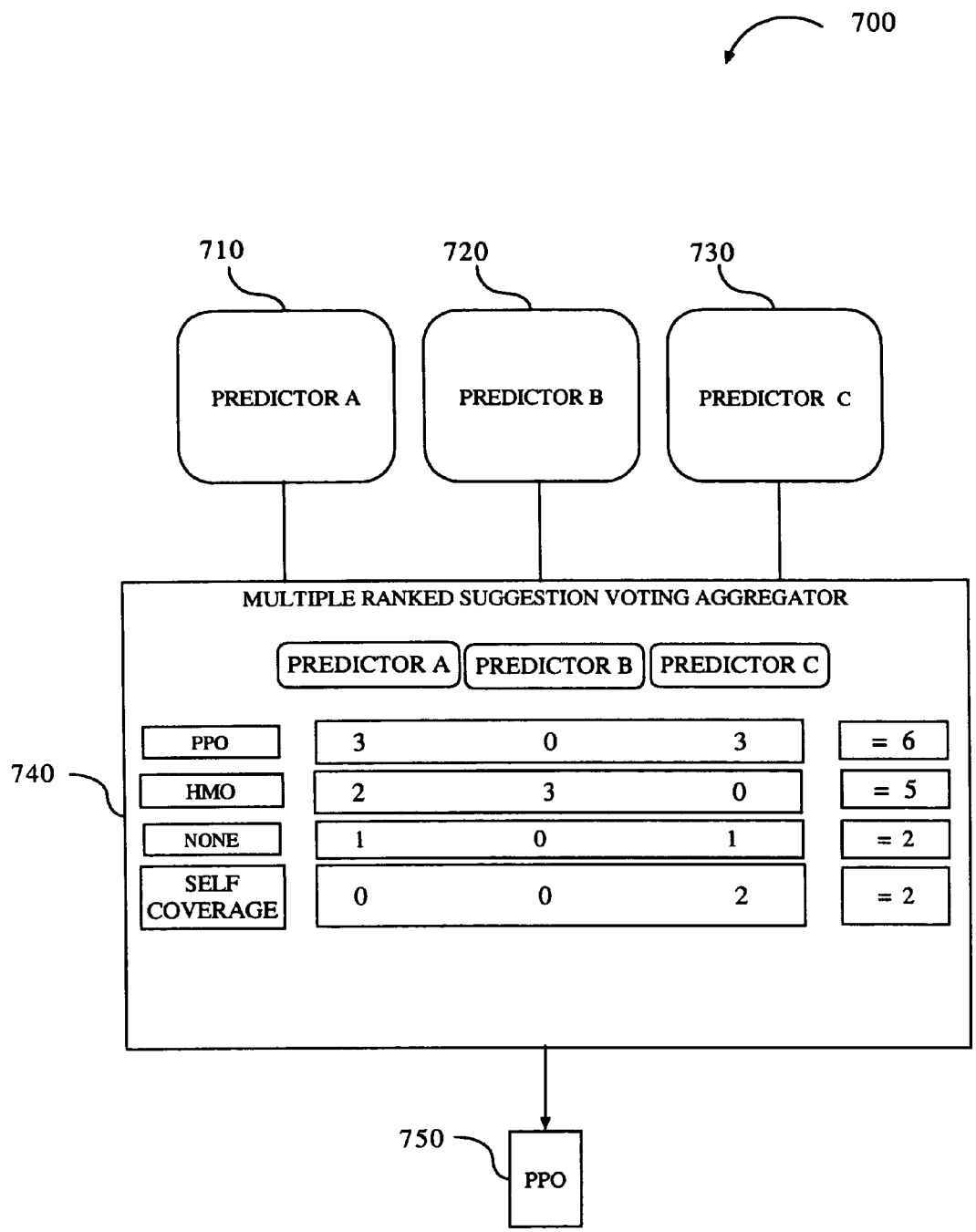
FIG. 7 depicts a voting and aggregation method in accordance with an embodiment of the present invention.

Referring to FIG. 7, an exemplary voting and aggregation method 700 in accordance with an embodiment of the present invention is shown. One or more predictors 710-730 may provide multiple values for an incomplete data entry field and a multiple ranked suggestion voting aggregator 740 may select a best overall suggestion. A value for the node insurance_plan::type may have one of four possible values HMO, PPO, Self-Coverage, or None. Predictor A 710 may return three suggestions, with PPO being the highest ranked. Predictor B 720 may return a single suggestion, HMO, and Predictor C 730 may return 3 suggestions, also with PPO being the most probable. In this case, the maximum number of suggestions returned by any one predictor is 3, so the highest ranked suggestion for each predictor will be assigned 3−1+1 votes, the second suggestion from each predictor will be assigned 3−2+1 votes and the least suggested will be assigned 3−3+1 votes. The class value PPO receives three votes from Predictor A and three votes from Predictor C, giving it six in total, the largest number of votes. PPO 750 may be considered the best overall suggestion. A user may accept PPO as the correct suggestion, may select one of the alternative suggestions, or may manually enter a non-suggested value.

Voting and aggregation method 700 may form a consensus decision electing a value most suggested by the plurality of predictors 710-730. Voting may be determined from past accuracy of proposed values for a given node in a document collection for an individual predictor. An individual predictor may be assigned a weight corresponding to the predictor's past accuracy. When the predictor selects a suggestion, individual predictor weight assignment may be updated to record the accuracy of the suggestion.

A system in accordance with the present invention may calculate an error rate for predicted suggestions. Error rate may be determined from the number of incorrect suggestions over the total number of suggestions. Error rate may provide performance feedback for a predictor on a node. Performance feedback may be utilized to determine the weight of a predictor's suggestion. Additionally, error rate calculation may be useful, as one or more individual predictors may provide a null suggestion. A null suggestion may occur if a current set of instances does not meet one or more assumptions of a prediction algorithm. Failure to meet an assumption may prevent an algorithm from executing, resulting in a null suggestion. A null suggestion may also be returned from a predictor if its algorithm is terminated during a suggestion process due to failure to provide a suggestion within specified time parameters.

Figure 8:
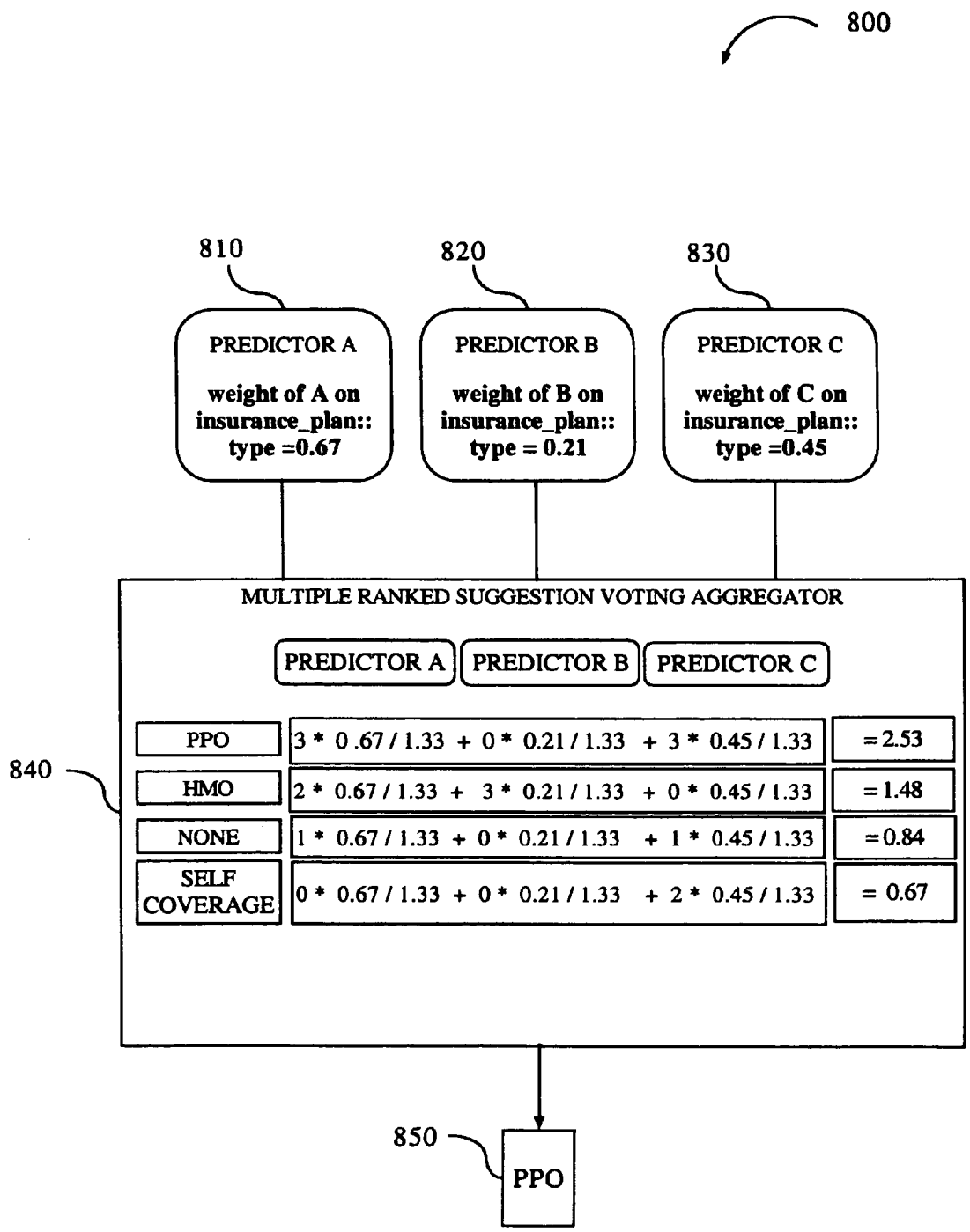
FIG. 8 depicts a weighting method in accordance with an embodiment of the present invention.

Referring to FIG. 8, an exemplary weighting method 800 in accordance with the present invention is shown. One or more predictors 810-830 may provide multiple values for an incomplete data entry field and a multiple ranked suggestion voting aggregator 840 may provide suggestions based upon values cast by each predictor 810-830 and the weighting applied to each predictor. In one embodiment of the invention, a single best overall suggestion may be provided to the user based upon the voting and weighting method of the present invention. A weighting system may determine and analyze a predictor's previous performance and assign a weight to a suggested value provided by a predictor. A predictor may perform more or less accurately on different nodes. For example, Predictor A may be a K Nearest Neighbor predictor, and may be assigned a weight of 0.67. Predictor B may be a C4.5 predictor, and may be assigned a weight of 0.21. Predictor C may be a naïve Bayesian predictor, and may be assigned a weight of 0.45. Accuracy of performance may depend on various parameters, including frequency of node appearance in a database, and type and statistical distribution of values for a node across a database. Weighting system may determine algorithm performance on a node and weight votes for the predictor accordingly. A predictor subsystem may return multiple suggestions ranked by an individual predictor based on potential correctness. The weight of each internal predictor may be determined from past performance. For example, an internal predictor may be assigned greater or less weight based on their ranking of the correct value. In this manner, overall prediction accuracy of a predictor may be improved.

Error rate calculation may be utilized to determine predictor weight. Predictor weight may be calculated from the following:

$$wt_{i,n} = 1 - \text{errorrate} \quad \text{or} \quad wt_{i,n} = 1 - \left( \frac{S_{i,n\ldots incorrect}}{S_{i,n\ldots total}} \right)$$

(Where i is a predictor, $s_{i, n \ldots incorrect}$ is the number of incorrect suggestions and $s_{i, n \ldots total}$ is a predictors total number of suggestions.) The total number of suggestions per node given by an individual predictor and the total number of errors in suggestions for the node by each predictor may be recorded. Predictors may be initially assigned equivalent weights. Predictor weight may be updated after a suggestion is made. For example, if a suggestion made by a predictor for a given node is correct, the total for suggestions of the predictor for that node may be incremented. However, if a suggestion made by a predictor for a given node is incorrect, the total for incorrect suggestions by the predictor for that node may be incremented. For example, a predictor may provide three suggestions ranked as [A, B, C]. If the correct value is A, the predictor may be assigned a weight of 1. If the correct value is B, the predictor may be assigned a weight of 0.66. If the correct value is C the predictor may be assigned a weight of 0.33. If the correct value is a value other than A, B or C, a predictor may not be assigned a weight. Weight assignment may be defined in a variety of ways, and may not be limited to equal distribution of weight to suggestions or parameters such as rank, number of provided suggestions or the like.

Prior to summing votes, a vote may be multiplied by the normalized weight for the node and predictor. Predictor weight may be normalized to prevent favoring of predictors who return non-null suggestions more often. Normalization may be accomplished by the following:

$$\text{Normalized } wt_{i,n} = \frac{wt_{i,n}}{\sum_{i=1}^{c} wt_{i,n}}$$

(where $wt_{i,n}$ is the weight assigned to the $i^{th}$ predictor when suggesting a value for node n and c is the total number of predictors).

A system in accordance with an embodiment of the present invention may be utilized for classification prediction for samples of data sets comprised of linearly structured data. Linearly structured data sets typically consist of a set of attributes describing data, events, objects or the like. Predictions may be determined from values of data stored in the same sort of data base format or data entry forms with linear structures. For example, a data set for eyewear may be described by a set of attributes including age of patient, spectacle prescription, astigmatic, tear production rate, and the like. Classifications may arise for a sample of this data set, such as fit patient with hard contact lenses, fit patient with soft contact lenses, do not fit patient with contact lenses. Based on the attribute values, predictor may then predict the appropriate classification for a sample and provide suggestions. A user may then accept a suggestion, or overwrite the suggestion and manually enter a desired classification. If a user selects a provided suggestion, suggestion may be stored in database 120, and the value may be analyzed by predicting subsystem 130 for providing future suggestions. If a user manually provides a classification value, the value may be stored by the system in the database, and the predictor may include manually provided suggestion in a future classification prediction.

In an embodiment of the invention, data entry system 100 of FIG. 1 may be employed to provide database error detection. An input database may contain numerous errors due to inaccurate entry or data corruption. Data entry system 100 may be employed to detect errors in the input database and provide one or more suggestions for fields where errors are detected. Processing subsystem 110 may be capable of receiving completed databases. Database 120 may store parsed extensible markup language documents, and may further maintain a plurality of relationships among received data of previously received databases. Predicting subsystem 130 may review an input database and check entries of the input database. Predicting subsystem 130 may analyze a plurality of relationships stored in database 120 to predict an entry for the input database. If the predicted entry is a match with the completed entry, the database entry may be judged as a correct entry. If the predicted entry is not a match with the entered information, an error alert may be provided.

When an error is detected, predicting subsystem 130 may provide an error message which may be a visual indication, for example, underlining of potential errors or a list of potential errors may be presented to the user similar to conventional word processing error detection systems. It is contemplated that any detected errors may be supplemented with one or more suggestions as discussed for an uncompleted field whereby a user may easily correct the error by accepting the suggestion or manually overwrite a suggestion for another value. Any fields of input database that are not completed may also be judged as an error and predicting subsystem 130 may provide one or more suggestions to complete the empty field.

Figure 9:
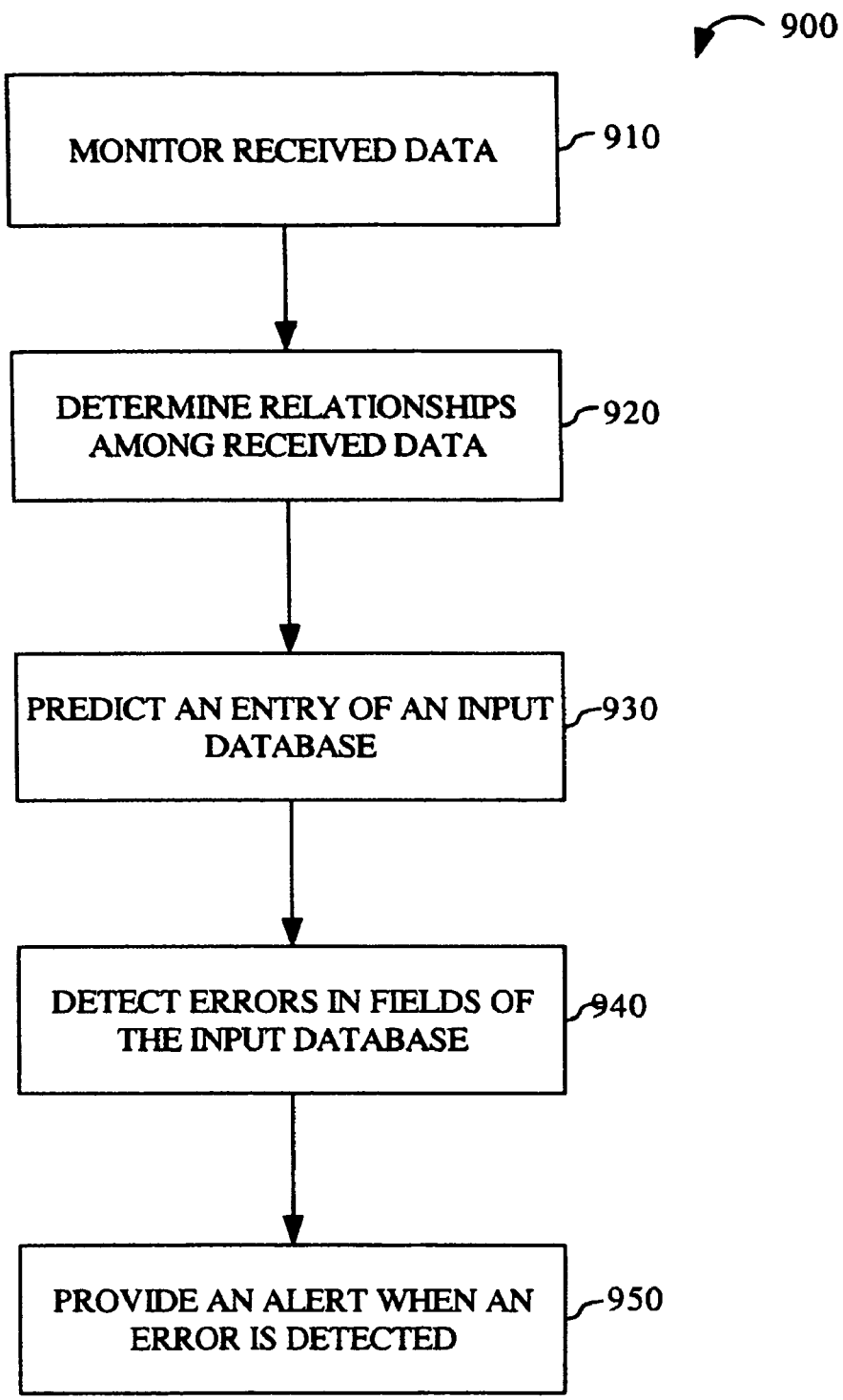
FIG. 9 depicts a method of checking a database for errors in accordance with an embodiment of the present invention.

Referring to FIG. 9, a method 900 of checking a database for errors in accordance with an embodiment of the present invention is shown. Method 900 may begin by monitoring received data from previously completed databases 910. Relationships among data of received databases may be determined 920. An entry of said input database may be predicted based upon received data and relationships among received data 930. It is contemplated prediction of entries may be implemented as previously described in FIGS. 1-8. Detection of an error may be determined 940 by comparing said predicted entry and an entered entry of said input database. If the predicted entry matches the entered entry, the entered entry may be judged as a correct entry. If the predicted entry does not match the entered entry, then the entered entry may be judged as an incorrect entry, or an error. An alert may be provided when an error is detected 950. It is further contemplated that one or more predicted entries may be provided to the user for correction of any detected errors.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for automatic data entry of information, comprising:
    a processor, said processor being configured to receive a plurality of documents and parse data entered in said plurality of documents;
    a database structure, said database structure being configured to store parsed data,
    wherein a plurality of relationships developed from said parsed data is maintained; and
    an ensemble predictor, said ensemble predictor being configured to review entered data of an input document and said plurality of relationships from said received plurality of documents and provide a suggestion for an uncompleted field of said input document said ensemble predictor including:
    a plurality of individual predictors; and
    a suggestion aggregator, said suggestion aggregator providing a single suggestion based upon a voting scheme among said plurality of individual predictors, at least one of said plurality of individual predictors including a weighting system determining performance of an individual predictor of said plurality of individual predictors and weights votes of an individual predictor based upon past performance.

2. The system as claimed in claim 1, wherein said documents are extensible markup language documents.

3. The system as claimed in claim 1, wherein said processing subsystem parses data of a completed document and stores the parsed data of said completed document in said database.

4. The system as claimed in claim 1, wherein said plurality of relationships developed from said parsed data includes node-value pairs and attribute-value pairs.

5. The system as claimed in claim 1, wherein said plurality of individual predictors include at least one of a statistical predictor, an inductive predictor or an instance-based predictor.

6. The system as claimed in claim 5, wherein said statistical predictor is a naïve Bayesian classifier.

7. The system as claimed in claim 5, wherein said inductive predictor is a C4.5 inductive learning predictor.

8. The system as claimed in claim 5, wherein said instance-based predictor is a K-Nearest-Neighbor predictor.

9. The system as claimed in claim 1, wherein said weighting system assigns a weight to each individual predictor of the plurality of individual predictors based on a percentage of correctly provided suggestions of a total number of suggestions.

10. The system as claimed in claim 9, wherein said weighting system adapts to multiple data domain types through adjustment of weighting for each individual predictor of said plurality of individual predictors based on past performance.

11. The system as claimed in claim 1, wherein said suggestion aggregator provides a single suggestion based upon a voting scheme among the plurality of predictors in combination with weighting of each vote from each individual predictor.

12. A method for automating data entry of information, comprising:
    monitoring data received from a plurality of documents via a processor configured to receive said plurality of documents and parse data entered in said plurality of documents;
    analyzing relationships among said data received from a plurality of documents via an ensemble predictor; and
    predicting a data entry field via said ensemble predictor;
    determining performance of each individual predictor of said plurality of individual predictors via said ensemble predictor;
    weighing votes of an individual predictor based upon past performance via a weighting system of said ensemble predictor, wherein a plurality of predicted data entries are provided based on said data received from a plurality of documents and relationships among said data received from a plurality of documents, and
    providing a single suggestion from a plurality of predicted data entries for said data entry field via a suggestion aggregator, wherein said single suggestion is selected from predicted data entries.

13. The method as claimed in claim 12, wherein said single suggestion is selected by the suggestion aggregator based upon a voting scheme among said plurality of predicted data entries.

14. The method as claimed in claim 12, further comprising measuring an error rate of a prediction via said suggestion aggregator.

15. The method as claimed in claim 14, wherein said single suggestion selected by the suggestion aggregator is based upon a voting scheme and said error rates of said prediction.

16. A system for automating data entry of information, comprising:
    a processor, said processor being configured to receive a plurality of documents and parse data entered in said plurality of documents;
    a database structure, said database structure being configured to store parsed data, wherein a plurality of relationships developed from said parsed data is maintained; and
    an ensemble predictor, said ensemble predictor including:
        a plurality of individual predictors, said plurality of individual predictors including at least one of a statistical predictor, an inductive predictor or an instance-based predictor, wherein each individual predictor is configured to review entered data of an input document and said plurality of relationships from said received plurality of documents and submit at least one suggestion for a uncompleted field of said input document;
        a weighting system configured to analyze performance of each individual predictor and weigh votes of each individual predictor based upon past performance; and
        a suggestion aggregator configured to provide one or more data entries from said at least one suggestion from each individual predictor based upon a voting scheme among the plurality of predictors in combination with weighting of each vote from each individual predictor.

17. The system as claimed in claim 16, wherein said documents are extensible markup language documents.

18. The system as claimed in claim 16, wherein said processor parses data of a completed document and stores the parsed data of said completed document in said database.

19. The system as claimed in claim 16, wherein said plurality of relationships developed from said parsed data includes node-value pairs and attribute value pairs.

* * * * *